M. E. LEWIS.
AUTOMATIC PHONOGRAPH STOP.
APPLICATION FILED JUNE 10, 1911.

1,019,669.

Patented Mar. 5, 1912.

2 SHEETS—SHEET 1.

Witnesses
H. A. Stock.
H. Schroeder.

Inventor
Milton E. Lewis
By G. C. Vrooman,
his Attorney

M. E. LEWIS.
AUTOMATIC PHONOGRAPH STOP.
APPLICATION FILED JUNE 10, 1911.

1,019,669.

Patented Mar. 5, 1912.
2 SHEETS—SHEET 2.

Witnesses
H. G. Stock
H. C. Schroeder

Inventor
Milton E. Lewis
By T. C. Toomer,
his Attorney

UNITED STATES PATENT OFFICE.

MILTON E. LEWIS, OF OAKLAND, CALIFORNIA.

AUTOMATIC PHONOGRAPH-STOP.

1,019,669.  Specification of Letters Patent.  Patented Mar. 5, 1912.

Application filed June 10, 1911. Serial No. 632,455.

*To all whom it may concern:*

Be it known that I, MILTON E. LEWIS, a citizen of the United States, residing at Oakland, in the county of Alameda and State of California, have invented certain new and useful Improvements in Automatic Phonograph-Stops, of which the following is a specification.

This invention relates to phonographs and other similar sound producing machines and has for its object to provide an attachment therefor by means of which the machine may be automatically stopped when the end of the record is reached.

The attachment comprises in its general features a pin mounted on the revoluble disk of the machine and a projection on the transmitter which engages said pin when the end of the record is reached and causes the pin to engage a brake which acts upon the revolving plate to bring the machine to a stop.

Figure 1:
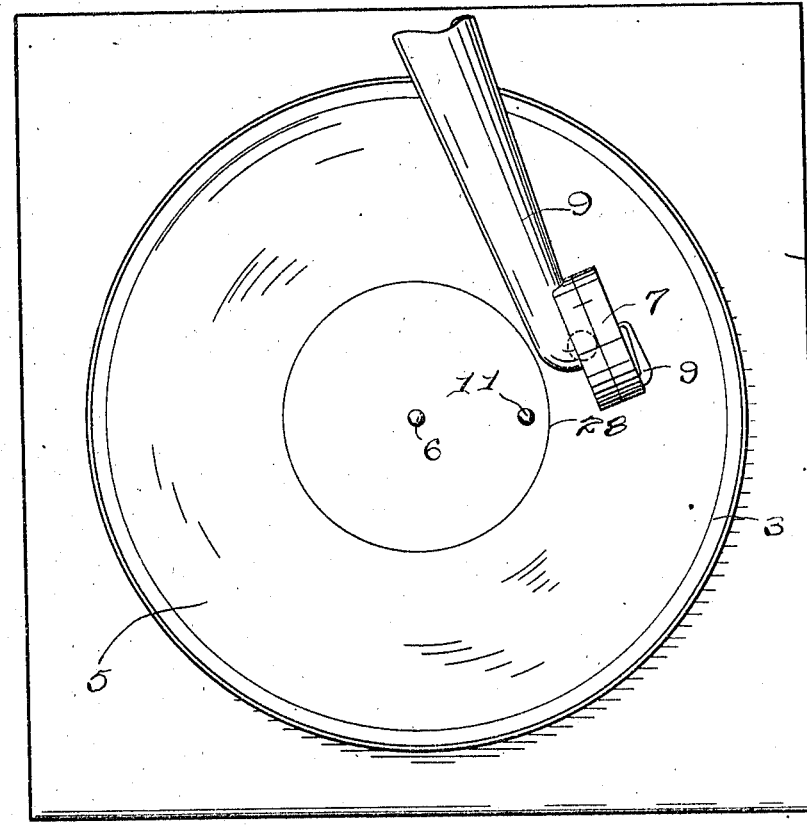
Figure 2:
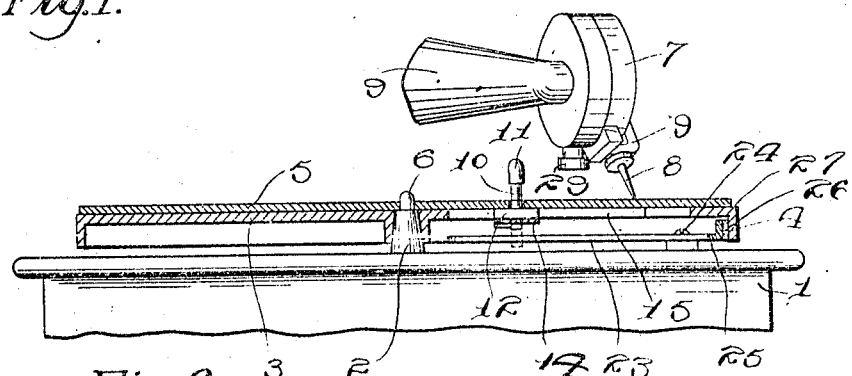
Figure 3:
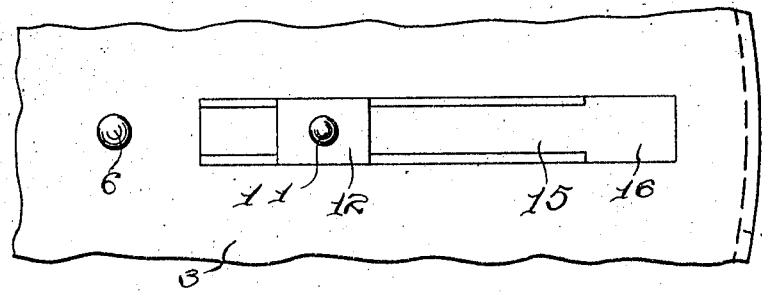
Figure 4:
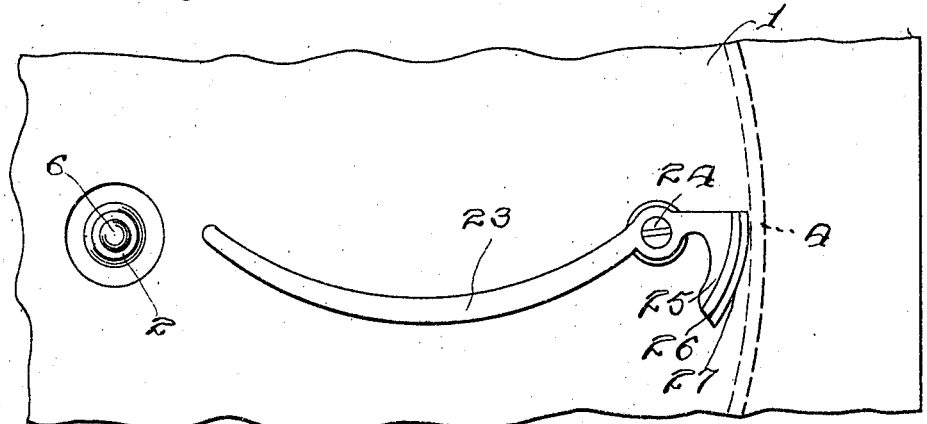
Figure 5:
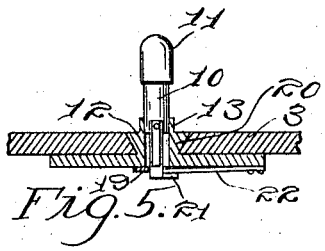
Figure 6:
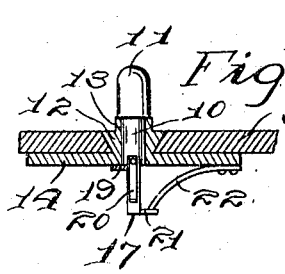
Figure 7:
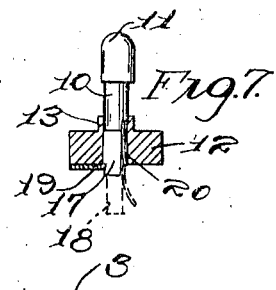
Figure 8:
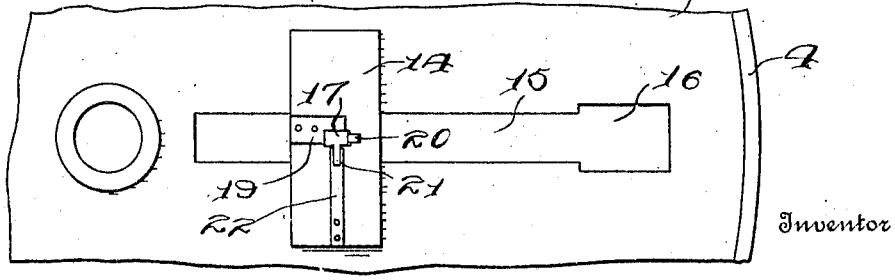

Referring to the accompanying drawings:—Figure 1 is a plan view of a phonograph of the disk type, provided with an attachment constructed in accordance with this invention. Fig. 2 is a view of the top of the phonograph casing with the revoluble plate and a disk record thereon in cross section and a transmitter and a portion of its supporting arm. Fig. 3 is a detail view of an enlarged portion of the revoluble plate. Fig. 4 is an enlarged detail view of a portion of the top of the phonograph casing, looking at the upper side thereof and showing a brake employed with this invention. Fig. 5 is an enlarged detail view in cross section of a portion of a revoluble plate and an adjustable pin employed with this invention, shown in elevated position. Fig. 6 is a view similar to Fig. 5 showing the pin in lowered position. Fig. 7 is a detail view showing the pin in elevated position and the slidable support in which the pin is mounted. Fig. 8 is an enlarged detail view of the underside of a revoluble plate showing a portion of the adjustable device employed in connection with this invention.

In the accompanying drawings 1 indicates the upper part of a phonograph casing through which projects the spindle 2 which is connected with the operating mechanism, said spindle having mounted thereon a revoluble circular plate 3 having the depending flange 4 at its periphery. Resting upon the plate 3 is a disk record 5 held in place by means of a pin 6 on the spindle 2. Located above the disk record 5 is a transmitter 7 having a stylus 8 mounted on the usual supporting arm 9.

Projecting through a hole in the record disk 5 adjacent to the end of the record is a pin 10 having a shouldered head 11, the pin 10 being located in a hole in a block 12 having an upwardly projecting portion 13 which serves as a stop for the shouldered head 11. The block 12 projects from a plate 14 located on the underside of the circular plate 3, the block 12 which has inclined sides being located in a longitudinal slot 15 in the plate 3 and having inclined sides conforming to the inclined sides of the block 12 whereby the latter is held in position in said slot and adapted to slide therein. At one end of the slot 15 is an opening 16 in the plate 3 which is wider than the slot 15 and through which the plate 14 is adapted to be passed to remove it from the plate 3. The pin 10 is provided with a rectangular extension 17 which is of less width than the hole through the plate 3 thereby permitting it to move laterally therein and the lower end of said extension 17 is provided with a notch 18 adapted to engage a plate 19 on the underside of the plate 3 and projecting slightly over the mouth of the hole in the plate 3, the extension 17 being held in locked engagement with the plate 19 by means of a spring 20 on the opposite side of the extension 17 which bears against one side of the hole in which the extension 17 is located. The pin 10 in its normal position is located in the hole in the block 12 with the extension 17 projecting below said hole and on the lower end of the extension 17 is a lateral projection 21 with which is engaged one end of a spring 22 secured to the plate 14.

Mounted on the top of the phonograph casing 1 is a brake consisting of a curved arm 23 pivoted at 24 to the upper side of the box 1 and provided with a curved brake head 25 having a cam shaped curved surface 26 on which a friction strip 27 adapted to bear against the flange 4 of the plate 3 is mounted.

The head 11 of the pin 10 is located as shown in Fig. 1 at a point adjacent to the end of the record as indicated by the line 28. Mounted on the transmitter 7 is a depending button shaped projection 29 which when the end of the record is reached engages the head 11 of the pin 10.

The operation of this device is as follows: Before the machine is started the pin 10 is pulled up from its normal position as shown in Fig. 6 to the position shown in Fig. 5, the pin being held in such position by the notch 18 in the extension 17 engaging the plate 19, as shown in Fig. 7. As the stylus approaches the end of the record the projection 29 advances toward the head 11 of the pin 10 and when the record is finished is brought into contact with the head 11 acting upon the pin to release the extension 17 from engagement with the plate 19, the extension 17 swinging over against the spring 20 and compressing the same. The spring 22 being under tension in the position shown in Fig. 5, when the extension 17 is released, the pin 10 is immediately pulled down to the position shown in Fig. 6. The extension 16 then strikes the brake arm 23 and thereby throws the brake 24 into engagement with the flange 4 of the plate 3 causing the machine to stop.

By means of the sliding block 12 and plate 14 the pin 10 may be adjusted for any length of record by adjusting the block 12 at a desired point in the slot 15.

What I claim is:—

1. In a sound producing machine of the kind described, a phonograph casing, a brake on the top of said casing, a revoluble plate on the top of said casing and above said brake and adapted to be engaged thereby, a block slidably mounted on said plate, a pin vertically movable in said block, means for holding said pin in elevated position, means for automatically lowering said pin, and a transmitter having a projection adapted to engage said pin and cause it to be released and drawn downward into engagement with said brake.

2. In a sound producing machine of the kind described, a phonograph casing, a brake having a brake arm pivoted thereto, and a cam shaped brake head, a revoluble plate mounted on top of said phonograph casing above said brake and adapted to be engaged thereby, a block slidably mounted on said plate, a pin vertically movable in said block, a catch for holding said pin in elevated position controlled by a spring, a second spring for drawing down said pin when released from said catch, and a transmitter having a projection adapted to engage said pin and release the same to be drawn down by said spring into connection with said brake.

3. In a sound producing machine of the kind described, a phonograph casing, a spindle projecting through the top of the casing, a brake consisting of a lever arm pivoted to the top of said casing, and having one end located adjacent to said spindle, and a cam shaped brake head at its other end, a revoluble plate located above said brake having a depending flange adapted to be engaged thereby, a block slidably mounted in said revoluble plate and adjustable thereon and located adjacent to the central portion of the plate, a vertically movable pin located in said block, and having a reduced extension laterally movable in a hole in said block and provided with a notch on one side, and a spring on the other, a projection adapted to be engaged by said notch to hold said pin in elevated position, a lateral projection on said extension, a spring connected with said block engaging said projection and adapted to move said pin downward, and a transmitter having a projection adapted to engage said pin when the end of a record is reached, and release the same, and permit it to be drawn down by said spring into operative position to engage said brake arm.

In testimony whereof I affix my signature in presence of two witnesses.

MILTON E. LEWIS.

Witnesses:
W. A. STOCK,
H. C. SCHROEDER.